Oct. 11, 1927.
W. R. GRISWOLD
MOTOR VEHICLE
Filed Oct. 24, 1925
1,645,323
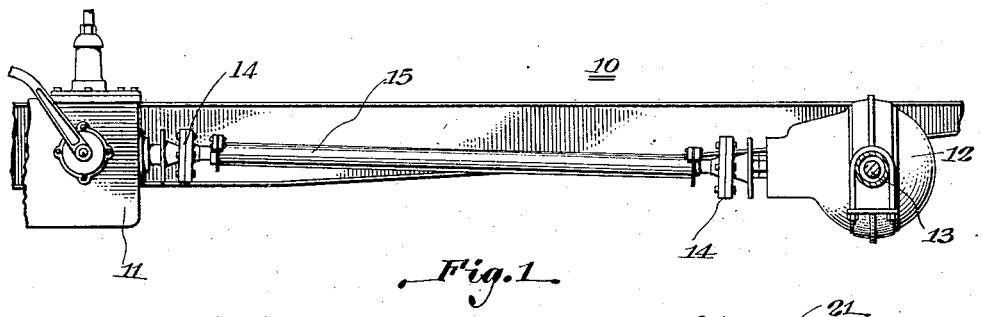
Fig.1
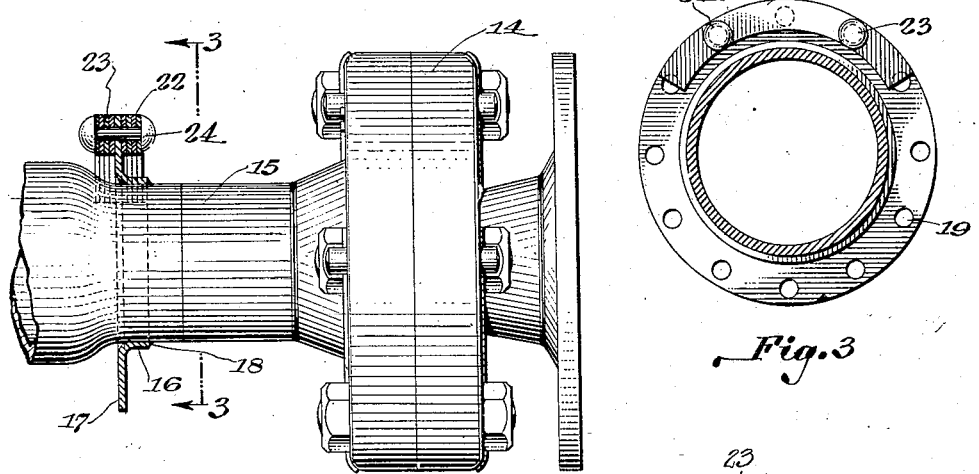
Fig.2
Fig.3
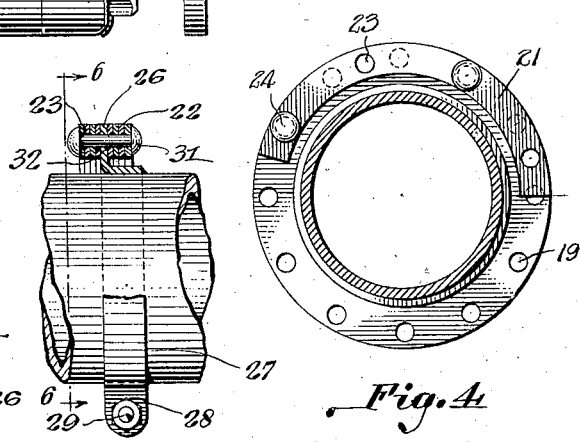
Fig.5
Fig.4
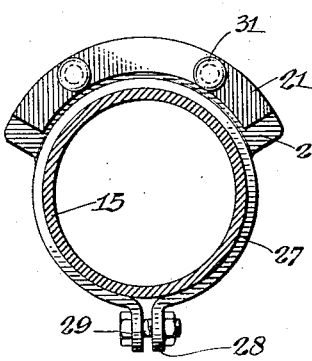
Fig.6
Inventor
Walter R. Griswold
By [signature]
Attorney Patented Oct. 11, 1927.

1,645,323

UNITED STATES PATENT OFFICE.

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 24, 1925. Serial No. 64,517.

This invention relates to motor vehicles and more particularly to the propeller shafts thereof. It has for one of its objects to provide means by which such shafts may be easily and quickly placed in dynamic balance.

Another object of the invention is to provide balancing devices for shafts which shall be simple and strong, and which shall be inexpensive to manufacture and to attach to the shaft.

Another object of the invention is to provide a shaft balancing device made up of similar parts, which may be inexpensively manufactured in quantities and subsequently applied in different arrangements to specific shafts to secure balance therein.

Another object of the invention is to provide a balancing device of which the mass moment may be adjusted by arrangement of its parts to fit the conditions requisite to the balancing of any specific shaft.

Other objects of the invention will appear from the following description taken in connection with the drawing, which forms a part of this specification and in which:

Fig. 1 is a view in side elevation, partially broken away, of part of a motor vehicle chassis, showing the application of the invention;

Fig. 2 is a view, partially in side elevation and partially in longitudinal section through a portion of the propeller shaft shown in Fig. 1;

Fig. 3 is a view in section substantially on the line 3—3 of Fig. 2;

Fig. 4 is a view similar to Fig. 3, showing an arrangement for securing a finer angular adjustment of the balancing weight member about the shaft axis;

Fig. 5 is a view, partially in side elevation and partially in longitudinal section through the propeller shaft of a motor vehicle showing a modified form of weight attaching means, and Fig. 6 is a view in section substantially on the line 6—6 of Fig. 5.

In most modern vehicles, the rear axle is driven from the engine through a clutch, a transmission or change speed gear, and a propeller shaft which is provided at one or both ends with universal joints to permit the necessary relative movement between the frame and the axle caused by spring deflection. Such shafts are usually tubular, the end portions to which the universal joints are attached being welded on, and because of variations in the stock, and manufacturing and other variations, it has been found that these shafts, as finished, are frequently in very poor dynamic balance. As most motor vehicles run the greater portion of the time in "high gear", which is usually a direct drive from the engine crank shaft, it will be appreciated that considerable disturbance may be caused by such lack of balance. This is frequently so severe as to cause a material whipping or lateral deflection of the shaft which is very destructive to the universal joints and to other bearings in the power line. It has been previously proposed to balance shafts of this nature by attaching weights thereto, or by removing metal therefrom, but such operations do not always result in accurate balancing and frequently weaken and disfigure the shaft. The cost of balancing by such methods is also frequently prohibitively expensive.

Referring to the drawing, at 10 is shown a portion of the frame of a motor vehicle chassis having the transmission gear case 11, and a differential and drive gear housing 12 from which the rear axle shafts 13 are driven in the usual manner. Transmission gearing in the casing 11 is driven through a suitable clutch from an engine (not shown) mounted at the front of the frame in the well known manner. Just behind the transmission gear and just ahead of the rear axle are universal joints 14, connected by a propeller shaft 15 to complete the drive from the vehicle engine to the wheels. This shaft 15 is preferably of tubular construction connected at its ends to the co-operating elements of the universal joints 14 in any convenient way, and it is to means for placing this shaft in dynamic balance that the present invention is directed.

It is well known that any rotating body may be completely balanced dynamically by adding or subtracting mass therefrom in two spaced planes, normal to the axis of rotation of the body. Such correction planes may be chosen arbitrarily, but in the present instance they may be conveniently taken near the ends of the shaft 15. Then the mass moment required, and the angular position of the center of gravity of the balancing masses to be added in these planes, will depend entirely on the specific unbalance of the particular shaft. The amount and angular relation of the correction weights may be readily determined by trial on a balancing machine of any suitable type. As the construction, theory and operation of such machines are well understood in the art to which this invention relates, and as they form no part of the present invention, they will not be described herein. The present invention provides means by which the necessary correction weights may be easily and accurately fixed to the shaft in the proper position to secure the proper balancing effect without weakening or disfiguring the shaft in any way.

At 16 is shown a band member adapted to embrace the propeller shaft 15, which band is provided with a radially disposed flange 17, preferably integral therewith. The band 16 is formed a close fit on the shaft 15 and is adapted to be permanently attached thereto in any suitable manner, but preferably by welding the edge thereof as indicated at 18. It is attached to the shaft in such a position that its flange 17 lies in the balancing plane selected. This band and flange form a weight attaching member which has a uniformly distributed mass about the axis of the shaft 15, so that its center of gravity lies on the axis of rotation thereof.

The flange 17 is provided with a plurality of spaced holes 19 disposed axially of the shaft for the attachment of suitable weight members 21 which are preferably arcuate, and which conform to the curvature of the flange. These weight members 21 constitute a laminar structure, being formed of thin shim-like plates 22 each of which is curved to conform to the flange 17 and each of which is provided with axially disposed holes 23 spaced to correspond to the holes 19 in the flange 17. These plates 22 are of substantially equal weight so that the weight of the member 21 is easily adjustable by adding plates thereto or removing plates therefrom, and this adjustment in the weight of the member 21 may be effected without materially changing the location of the center of gravity of the weight member.

The weight members 21 are secured to the flange 17 by any suitable means such as rivets or bolts 24 which pass through the holes 23 and 19 in the members and in the flange, respectively. By properly choosing the holes 19 in the flange, the members 21 may be arranged about the axis of the shaft in a close approximation to any desired phase or angular relation.

It will accordingly be seen that not only is the weight of each of the members 21 adjustable by the addition or removal of laminæ 22, but the angular disposition of the members about the axis of the shaft is also adjustable by the selection of suitable holes for the insertion of the attaching means 24, so that this structure provides a balancing device having an adjustable mass moment which may be placed to act in any predetermined angular relation about the shaft axis. It follows that the device may be adjusted to fit the requirements set up in any particular shaft as determined by the balancing machine.

In Fig. 4 is shown an arrangement by which the angular adjustment of the weight member 21 about the axis of the shaft may be carried out to a finer degree. In this embodiment of the invention the flange 17 is provided with an appropriate number of evenly spaced holes 19, and the holes 23 in the weight member are also evenly spaced but are a certain greater circumferential distance apart, so that some two of the holes in the weight member can always be alined with two of the holes in the flange. In this way a vernier adjustment of the weight member to the flange is secured.

In Figs. 5 and 6 is shown a modification of the device in which the weight members 21 are secured to a flange 26 formed upon a clamping band 27, which is adapted to surround the shaft 15. The ends of the band 27 are provided with outwardly disposed ears 28, and these ears are drawn together by a bolt 29 when the band is in position on the shaft, thus clamping it tightly in place. The weight of the ears 28 and the bolt 29 is preferably just balanced against the weight of the segmental flange 26, so that the center of gravity of the weight supporting structure is retained on the axis of rotation of the shaft. The weight member 21 is secured to the flange 26 by bolts or rivets 31, similar to the rivets 24, and the flange 26 is provided with suitable holes 32 spaced to aline with the holes 23 in the weight member for the purpose of attachment. It will be evident that the weight of member 21 may be adjusted by the insertion or removal of laminæ 22 in the manner previously described, and that the angular position of the weight member may be adjusted about the axis of the shaft by loosening the clamping bolt 29 and tightening it again when the band 27 is in adjusted position.

The laminæ 22, of which the weight members 21 are composed, may be inexpensively manufactured in large quantities by a stamping process, and the band and flange by which these weight members are attached to the shaft may also be readily manufactured in a similar manner. It will thus be evident that the inexpensive balancing device provided by this invention may be used to secure any desired degree of balancing effect within limits, upon shafts having widely differing degrees of unbalance, and without expensive drilling, chipping, grinding or similar operations.

It will be understood that various forms of the invention other than those described above may be used without departing from the spirit or scope of the invention.

Having thus described the invention, what is claimed and desired to be secured by Letters Patent is:

1. The combination with a propeller shaft for motor vehicles of a balancing device comprising a band adapted to surround the shaft and having a radially disposed flange, and laminated weight members adjustably secured to said flange.

2. The combination with a propeller shaft for motor vehicles of a balancing device comprising a band rigidly secured to the shaft, and removable laminated weight members secured to a portion of the band to remove the center of gravity of the device from the axis of the shaft.

3. The combination with a propeller shaft for motor vehicles of a balancing device comprising a band rigidly secured to the shaft and having a radially disposed flange, laminated arcuate weight members adapted to be carried by the flange, and means to secure said weights to the flange in a predetermined angular relation about the shaft axis.

4. The combination with a propeller shaft for motor vehicles of a balancing device comprising a band rigidly secured to the shaft and having a radially disposed flange provided with spaced holes, laminated weight members having similar holes differently spaced, and means adapted to pass through some of the holes in the flange and in said members to secure the weights to the flange in a predetermined angular relation.

5. The combination with a propeller shaft for motor vehicles of a balancing device having its center of gravity displaced from the shaft axis, said device comprising a nest of shims forming an arcuate weight member, and means to secure said member to the shaft in a predetermined angular relation.

6. The combination with a propeller shaft for motor vehicles of a balancing device having its center of gravity displaced from the shaft axis, said device comprising a nest of shims forming an arcuate mass of determinable weight, and means to secure said mass to the shaft in an adjustable angular relation.

7. A device for balancing shafts comprising a member of uniformly distributed mass secured to the shaft, and a member of adjustable weight secured to said first named member and having its center of gravity removed from the axis of rotation of the shaft.

8. A device for balancing shafts comprising a member of uniformly distributed mass secured to the shaft, a member of adjustable weight, and means to secure the first said member to the second said member in predetermined angular relation about the shaft axis.

9. A balancing device for shafts comprising a member formed of segmental shims each of definite weight, a member secured to the shaft and having its mass uniformly distributed about the axis of rotation of said shaft, and means to secure the weight member to the second named member in a predetermined phase relation about the shaft axis, to secure an adjustable mass moment of the assembled device.

10. A device for balancing shafts comprising a member secured to the shaft, a radially disposed flange on said member having evenly spaced holes, an arcuate weight member of variable mass having holes spaced in vernier relation to the holes in said flange, and means engaging some of the holes of the flange and of the weight member to finely adjust the angular position of said weight member on said shaft.

In testimony whereof I affix my signature.

WALTER R. GRISWOLD.